Patented May 29, 1934

1,960,526

UNITED STATES PATENT OFFICE 1,960,526

FLOTATION PROCESS AND REAGENT

Ludwig J. Christmann, Jersey City, N. J., assignor to American Cyanamid Company, New York, N. Y., a corporation of Maine No Drawing. Application March 11, 1929, Serial No. 346,248

9 Claims. (Cl. 209—166)

This invention relates to the recovery of copper and other metals from their ores by subjecting the same to a flotation operation, and the invention is particularly concerned with the use of a combination of a promoter and a frother for producing these results.

The particular object of the invention is to secure an increased recovery by the use of an organic promoter which has in and of itself little or no frothing action, a frother being added to produce this effect.

To this end the invention contemplates the use of alcoholic solutions of acids containing aromatic groups in the compounds as the promoters, together with a frother such as cresylic acid or a di-aryl or alkyl dithio-phosphoric acid, which is the subject matter of Patent No. 1,593,232 to Whitworth issued July 20, 1926, or mixtures of such frothers.

Malachite was chosen as a representative copper bearing ore upon which to conduct the flotation operations. In all cases a 50-gram sample which had been passed through rolls and ground on a bucking board to pass a 200-mesh screen, was used. The apparatus was a small 50-gram mechanically agitated flotation machine.

The procedure consisted in stirring 50 grams of the malachite for five minutes in the flotation machine with 135 cc. of distilled water, the reagents were then added and the mixture was stirred for two minutes. The water level was then brought up to the lip of the "Spitzkasten", water was run in from a constant level water bottle and the froth was collected for eight minutes. In this time the water bottle delivered 75 to 80 cc. of water. In the various runs the minimum and maximum pH of the filtrate was 7.4 and 7.8 respectively. A number of aromatic acids were chosen as being representative of the series and used in the amounts indicated. In all cases a quantity of a dithiophosphoric acid, equivalent to 1.44 lbs. per ton, was used as a frother.

A float conducted as above indicated, using 0.32 lbs. per ton of a solution of one gram of $\alpha$-anilinopropionic acid in 40 cc. of alcohol gave a recovery of 81.6%, while a recovery of 95.6% was had with a float using 0.64 lbs. per ton of the same promoter.

A run was made using as a promoter 0.16 lbs. per ton of a solution of 2-hydroxy 3-naphthoic acid prepared by dissolving one gram thereof in 44 cc. of ethyl alcohol, and a recovery of 71.4% was had while 94.2% was floated in an operation using 0.32 lbs. per ton of the reagent.

The flotation operation as above outlined was carried out on the same ore using as a promoter 0.64 lbs. per ton of solution of one gram of benzoic acid dissolved in 44 cc. of ethyl alcohol. 94.6% of the copper was floated. Using the promoter to the extent of 1.28 lbs. per ton floated 96.6%.

Favorable results were had by the use of a promoter prepared by dissolving one gram of cinnamic acid in 40 cc. of ethyl alcohol. When using 0.32 lbs. per ton of this promoter 91.0% was floated while a recovery of 98.6% was had with the use of 0.64 lbs. per ton of this reagent.

A solution of anthranilic acid was made by dissolving one gram thereof in 40 cc. of ethyl alcohol. 0.32 lbs. per ton of this reagent was added to a circuit and floated in accordance with the above procedure. A concentrate was obtained comprising 94.4% of the copper.

A float was conducted with a solution comprising one gram of mandelic acid in 40 cc. of ethyl alcohol to the extent of 0.16 lbs. per ton with the result that a float was secured representing 85.6% of the copper and a recovery of 90.4% was had using 0.32 lbs. per ton of this promoter.

A reagent was prepared by dissolving one gram of phenylglycine in 40 cc. of ethyl alcohol. When the equivalent of 0.08 lbs. per ton was used in a flotation operation a float was secured representing 94.2% of the copper.

In all of the above cases the solution of the aromatic acids had little or no frothing action and a dithiophosphoric acid was added to produce a froth, although other frothers, such as cresylic acid, may be used in lieu thereof.

From the above it is clear that alcoholic solutions of the aromatic acids produce good results in a flotation operation on copper ores where a frother is used such as those above mentioned.

It is to be understood that the ore and the reagents here set out are merely representative of other equivalents thereof, and I do not wish to be limited to the particular compounds here specified but the invention covers any equivalent falling within the scope of the claims.

What I claim is:

1. A method of recovering metals from their ores which consists in subjecting the ore to a flotation operation in the presence of an alcoholic solution of $\alpha$-anilinopropionic acid and a frother.

2. A method of recovering metals from their ores which consists in subjecting the ore to a flotation operation in the presence of an alcoholic solution of 2-hydroxy 3-naphthoic acid and a frother.

3. A method of recovering metals from their ores which consists in subjecting the ore to a flotation operation in the presence of an alcoholic solution of anthranilic acid and a frother.

4. A flotation reagent comprising an alcoholic solution of α-anilinopropionic acid.

5. A flotation reagent comprising an alcoholic solution of 2-hydroxy 3- naphthoic acid.

6. A flotation reagent comprising an alcoholic solution of anthranilic acid.

7. A method of recovering metals from their ores which consists in subjecting the ore to a flotation operation in the presence of a frother and a solution of an aromatic carboxylic acid taken from a group consisting of α-anilinopropionic acid 2-hydroxy 3-naphthoic acid, cinnamic acid, anthranilic acid, mandelic acid and phenyl glycine.

8. A flotation reagent comprising a solution of an aromatic carboxylic acid taken from a group consisting of α-anilinopropionic acid, 2-hydroxy 3-naphthoic acid, cinnamic acid, anthranilic acid, mandelic acid and phenyl glycine.

9. A method of recovering metals from their ores which consists in subjecting the ore to froth flotation in the presence of a frothing agent selected from a group consisting of organic substituted dithiophosphoric acid and cresylic acid and a froth flotation promoter consisting of an aromatic carboxylic acid.

LUDWIG J. CHRISTMANN.